No. 695,359. Patented Mar. 11, 1902.
P. W. WOLFE.
SCOOP.
(Application filed Sept. 21, 1901.)
(No Model.)

Witnesses:
F. L. Ourand
F. G. Radelfinger.

Inventor:
Philip W. Wolfe
By Louis Bagger & Co.,
Attorneys

UNITED STATES PATENT OFFICE.

PHILIP W. WOLFE, OF DOVER, NEW JERSEY.

SCOOP.

SPECIFICATION forming part of Letters Patent No. 695,359, dated March 11, 1902.

Application filed September 21, 1901. Serial No. 76,067. (No model.)

*To all whom it may concern:*

Be it known that I, PHILIP W. WOLFE, a citizen of the United States, residing at Dover, in the county of Morris and State of New Jersey, have invented new and useful Improvements in Scoops, of which the following is a specification.

My invention relates to scoops; and the object of the same is to construct a scoop for flour, sugar, &c., which will be provided with a handle of simple construction which will hold the scoop from spreading and at the same time greatly facilitate the operation of the same. This object is accomplished by the novel construction described in this specification and claimed and illustrated in the accompanying drawings, forming a part thereof, in which—

Figure 1:
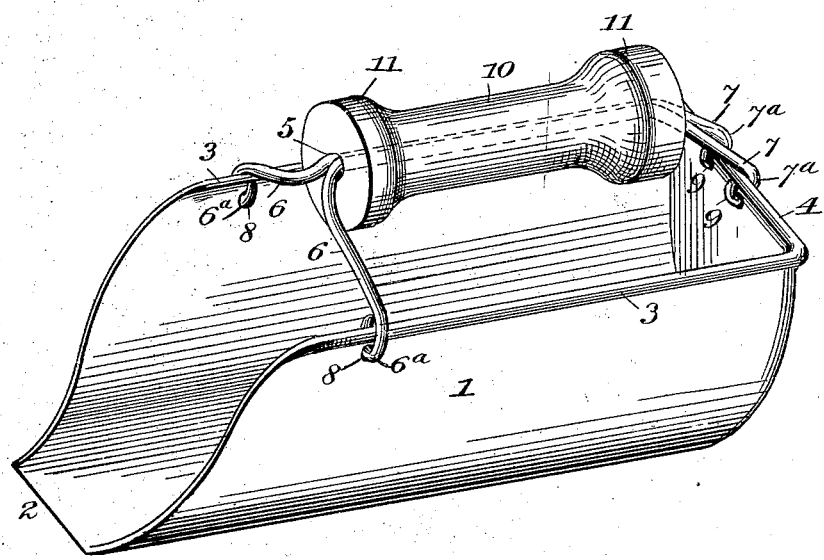
Figure 2:
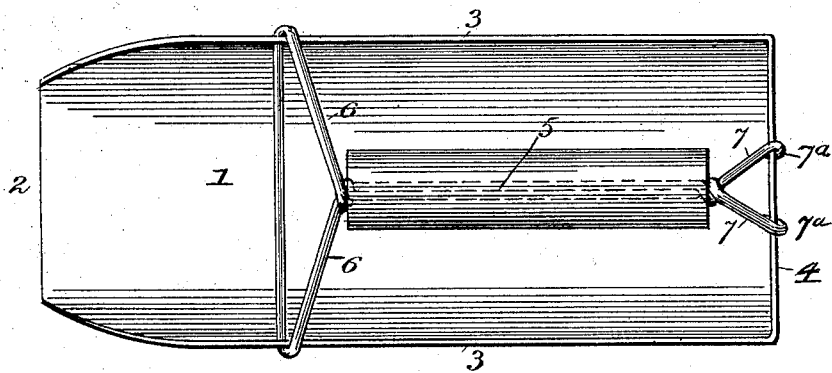

Figure 1 is a perspective of my handle and scoop. Fig. 2 is a modified form of handle.

The numeral 1 designates an open-mouthed scoop with a square lip 2 and having a rectangular wire frame secured to its upper edges. This frame has sides 3 and an end 4. A handle is provided for the scoop and comprises two parallel members 5, having oppositely-extending arms 6 on one end and diverging arms 7 on the other ends thereof. The arms 6 have eyes 6ª formed thereon which engage apertures 8 in the sides of the scoop and embrace the sides 3. The arms 7 have eyes 7ª on their extremes, which eyes pass through apertures 9 in the back of the scoop and embrace the end bar 4 of the frame. A cylindrical grip 10, having enlarged ends 11, is mounted on the members 5 and serves to hold them together and furnishes a grip for the hand. By this construction the scoop is held firmly against spreading.

In the modified form illustrated in Fig. 2 the members 5 are formed of a single piece of wire, the arms 6 being connected. This form adds very much to the strength of the device.

I do not wish to be limited as to details of construction, as these may be modified in many particulars without departing from the spirit of my invention.

Having described my invention, what I claim as new, and wish to secure by Letters Patent, is—

The combination with a scoop having an open mouth and top, of a handle extending longitudinally said scoop and having two pairs of arms thereon, one pair being connected to the sides of said scoop and the other pair being connected to the rear of said scoop, the arms connected to the sides of said scoop being connected to each other to brace the scoop and hold it from spreading, substantially as described.

In testimony whereof I have hereunto set my hand in presence of two subscribing witnesses.

PHILIP W. WOLFE.

Witnesses:
 I. B. CONDIT,
 CORNELIUS B. GAGE.